United States Patent
Maramara

(10) Patent No.: US 10,030,747 B2
(45) Date of Patent: *Jul. 24, 2018

(54) WAVE ENERGY CONVERSION SYSTEM

(71) Applicant: Brimes Energy Inc., Holbrook, NY (US)

(72) Inventor: Ramuel Maramara, Ronkonkoma, NY (US)

(73) Assignee: Brimes Energy Inc., Holbrook, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/651,460

(22) Filed: Jul. 17, 2017

(65) Prior Publication Data

US 2017/0314658 A1    Nov. 2, 2017

Related U.S. Application Data

(63) Continuation of application No. 14/682,674, filed on Apr. 9, 2015, now Pat. No. 9,709,142.
(Continued)

(51) Int. Cl.
*F16H 35/00* (2006.01)
*F03B 13/20* (2006.01)
*F03B 13/18* (2006.01)

(52) U.S. Cl.
CPC ......... *F16H 35/00* (2013.01); *F03B 13/1815* (2013.01); *F03B 13/20* (2013.01);
(Continued)

(58) Field of Classification Search
CPC .......... Y02E 10/38; Y02E 10/28; F03B 13/20
(Continued)

(56) References Cited

U.S. PATENT DOCUMENTS 3,240,158 A * 3/1966 Brundage ........... F04C 15/0038
 277/365
3,928,967 A   12/1975 Salter
(Continued)

FOREIGN PATENT DOCUMENTS

CN   103114957 A   5/2013
JP   S57196270 U   12/1982
(Continued)

OTHER PUBLICATIONS

International Search Report for PCT/US2015/025134 dated Jul. 13, 2015.
(Continued)

*Primary Examiner* — Tulsidas C Patel
*Assistant Examiner* — Charles Reid, Jr.
(74) *Attorney, Agent, or Firm* — Carter, DeLuca, Farrell & Schmidt, LLP

(57) ABSTRACT

A wave energy conversion system is provided including a pod, multi-radius energy transmission mechanism, and an electrical generating device. The pod is rotatably supported by a platform structure and the multi-radius energy transmission mechanism is in mechanical communication with the pod. The multi-radius energy transmission mechanism is configured to transmit a variable torque over a range of motion and is in mechanical communication with the electrical generating device.

17 Claims, 13 Drawing Sheets

Related U.S. Application Data

(60) Provisional application No. 61/977,371, filed on Apr. 9, 2014, provisional application No. 61/988,637, filed on May 5, 2014, provisional application No. 62/060,795, filed on Oct. 7, 2014.

(52) U.S. Cl.
CPC ... *F05B 2260/403* (2013.01); *F05B 2260/406* (2013.01); *Y02E 10/38* (2013.01)

(58) Field of Classification Search
USPC .................................................. 290/53, 42
See application file for complete search history.

(56) References Cited

U.S. PATENT DOCUMENTS

| | | | |
|---|---|---|---|
| 4,134,023 A | 1/1979 | Salter | |
| 4,288,986 A | 9/1981 | Watson | |
| 4,300,871 A | 11/1981 | Laithwaite et al. | |
| 4,357,543 A * | 11/1982 | Penn | F03B 13/145 290/42 |
| 4,480,966 A | 11/1984 | Smith | |
| 5,983,439 A | 11/1999 | Hojnacki | |
| 6,644,947 B2 * | 11/2003 | Cavanaugh | F01C 1/084 418/150 |
| 7,105,942 B2 | 9/2006 | Henriksen | |
| 7,443,045 B2 | 10/2008 | Yemm | |
| 7,525,212 B1 | 4/2009 | Catlin | |
| 7,808,120 B2 | 10/2010 | Smith | |
| 7,834,474 B2 | 11/2010 | Whittaker et al. | |
| 7,956,478 B2 | 6/2011 | Steenstrup | |
| 8,049,356 B2 | 11/2011 | Chervin et al. | |
| 8,186,781 B2 | 5/2012 | Coleman et al. | |
| 8,304,925 B2 | 11/2012 | Yang et al. | |
| 8,312,785 B2 | 11/2012 | Breeser et al. | |
| 8,484,964 B2 | 7/2013 | Preftitsis et al. | |
| 8,618,686 B2 | 12/2013 | Jo | |
| 8,808,041 B2 | 8/2014 | Hine et al. | |
| 9,018,779 B2 | 4/2015 | Yemm et al. | |
| 9,062,649 B2 | 6/2015 | Greco | |
| 9,074,577 B2 | 7/2015 | Dehlsen | |
| 2004/0064947 A1 * | 4/2004 | Yanagimoto | B23F 15/02 29/893.3 |
| 2008/0272600 A1 | 11/2008 | Olson | |
| 2011/0031752 A1 | 2/2011 | Metzen | |
| 2011/0062713 A1 | 3/2011 | Ardoise et al. | |
| 2011/0285128 A1 | 11/2011 | Hobdy | |
| 2011/0304144 A1 | 12/2011 | Dehlsen et al. | |
| 2012/0295499 A1 | 11/2012 | Hine | |
| 2013/0006445 A1 | 1/2013 | Hine | |
| 2013/0104538 A1 | 5/2013 | Yuck et al. | |
| 2014/0265339 A1 | 9/2014 | Dehlsen | |
| 2014/0377052 A1 | 12/2014 | Larsen | |

FOREIGN PATENT DOCUMENTS

| | | |
|---|---|---|
| JP | 6-330999 | 11/2008 |
| KR | 101086299 B1 | 11/2011 |

OTHER PUBLICATIONS

PCT Notice for application No. PCT/US2015/025134 dated Oct. 20, 2016.
European Search Report dated Nov. 27, 2017 issued in EP Application No. 15776111.
Australian Examination Report dated Mar. 23, 2018 issued in corresponding AU Appln. No. 2015243499.

* cited by examiner

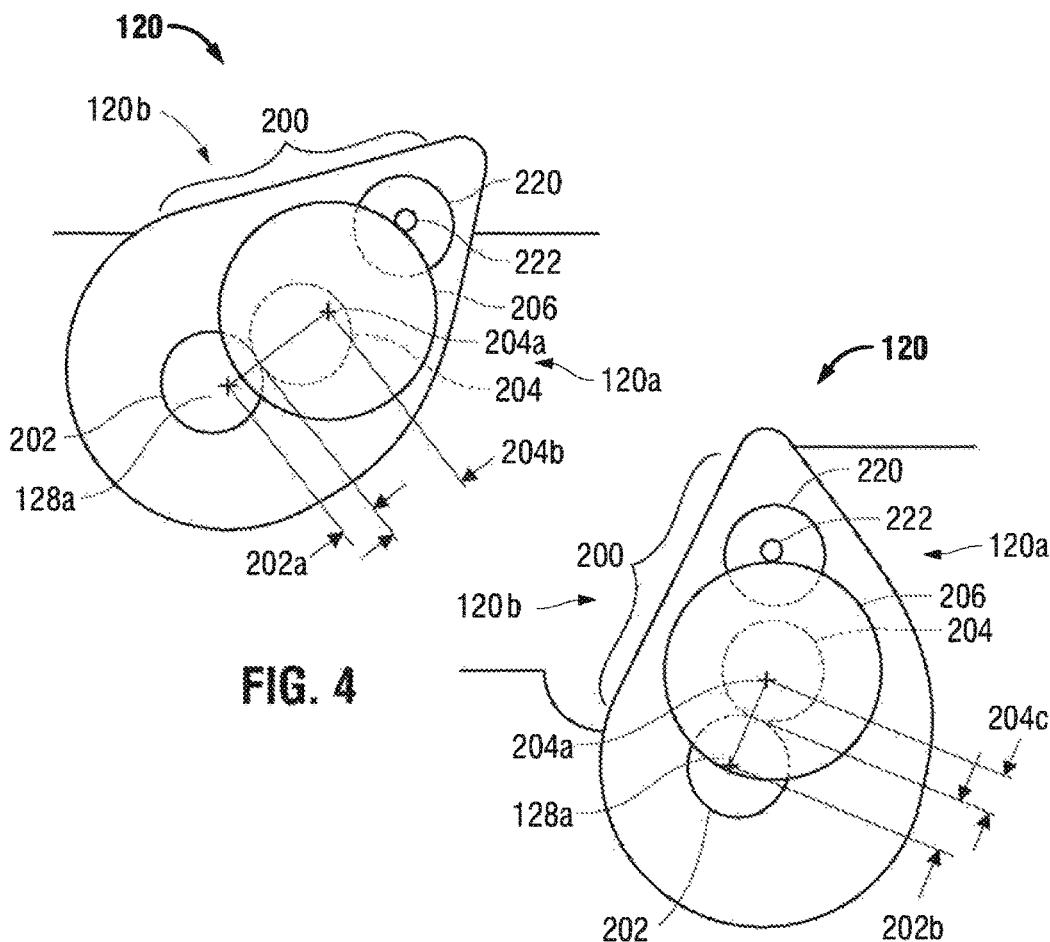
FIG. 4
FIG. 4A
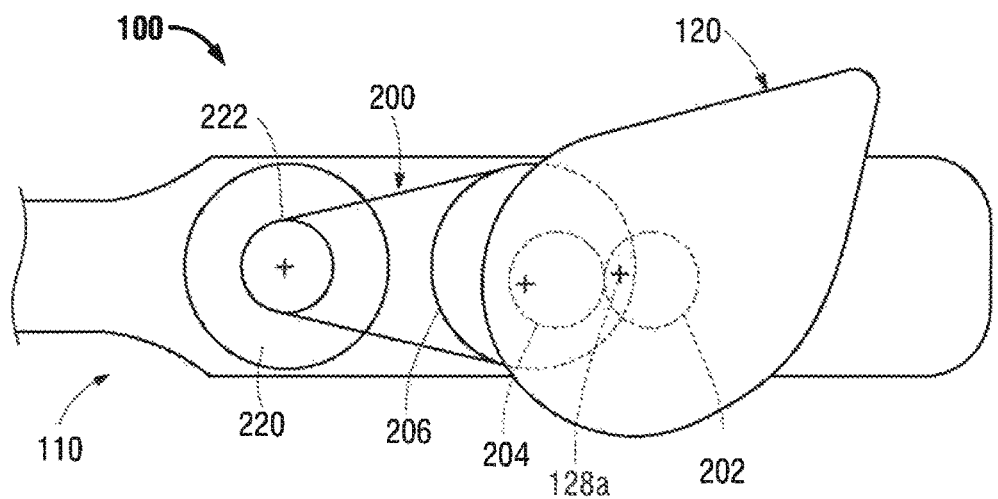
FIG. 4B

WAVE ENERGY CONVERSION SYSTEM

CROSS-REFERENCE TO RELATED APPLICATIONS

This application is a Continuation of U.S. patent application Ser. No. 14/682,674, filed on Apr. 9, 2015, which claims the benefit of, and priority to, U.S. Provisional Patent Application Ser. No. 61/977,371, filed on Apr. 9, 2014, U.S. Provisional Patent Application Ser. No. 61/988,637, filed on May 5, 2014, and U.S. Provisional Patent Application Ser. No. 62/060,795, filed on Oct. 7, 2014, the entire contents of each of which are incorporated by reference herein by reference.

BACKGROUND

Technical Field

The present disclosure relates to energy conversion devices and, more particularly, to systems for converting energy from the wave patterns of a body of water into electrical energy.

Description of Related Art

Significant effort has been expended on developing technologies able to utilize the earth's tremendous power. For centuries, devices such as windmills, watermills, hydro-turbines, geo-thermal heat generators, and solar energy panels have been developed and refined to capture and convert the earth's energy into electrical energy. However, even though over 70% of the earth's surface is covered by oceans, very little innovation has been developed capable of efficiently harnessing this vast power. It is estimated that ocean waves are capable of generating an energy flux between 10 kW and 80 kW per meter of coastline. Most importantly, this energy is generated on a nearly continuous basis, with little to no interruption as compared to solar or wind powered solutions. Accordingly, a need for an efficient, scalable, and cost efficient system for harnessing the power of the ocean's waves is needed.

SUMMARY

A wave energy conversion system is provided in accordance with the present disclosure includes a pod, a multi-radius energy transmission mechanism, and an electrical generating device. The pod is rotatably supported by a platform structure and the multi-radius energy transmission mechanism is in mechanical communication with the pod. The multi-radius energy transmission mechanism is configured to transmit a variable torque over a range of motion. The electrical generating device is in mechanical communication with the multi-radius energy transmission mechanism.

The pod may be buoyant and may be configured to be rotated as a wave contacts a planar side surface disposed on a leading side of the pod. In certain aspects, the multi-radius energy transmission mechanism may include a drive gear rotatably supported on a drive-shaft extending through the center of rotation of the pod. The drive gear may be mechanically coupled to the pod. Alternatively, the multi-radius energy transmission mechanism may include a driven gear rotatably supported on a post fixedly secured to the platform structure. The drive gear and the driven gear may include an ellipsoid profile. The driven gear may be in mechanical communication with the drive gear.

In aspects, rotation of the pod may initiate rotation of the drive gear about driveshaft, thereby initiating a rotation of the driven gear about the post. The radius of the drive gear at a location adjacent the driven gear may increase as the drive gear rotates. The radius of the driven gear at a location adjacent the drive gear may decrease as the driven gear rotates, thereby transmitting a variable torque.

In certain aspects, the multi-radius energy transmission mechanism may include a spur gear rotatably supported on the post. The spur gear may be in mechanical communication with the driven gear and the electrical generating device.

In certain aspects, the electrical generating device may include a hydraulic circuit. The hydraulic circuit may include a hydraulic actuator in mechanical communication with the multi-radius energy transmission mechanism. The hydraulic actuator may be in hydraulic communication with a hydraulic motor. Actuation of the hydraulic actuator may cause the hydraulic motor to rotate, thereby causing an electrical generator in mechanical communication therewith to generate electrical energy.

In certain aspects, the drive gear and the driven gear may be rotatably supported at a location other than their geometric centers. The drive gear and the driven gear may be circular gears. The drive gear and the driven gear may be elliptical gears. The drive gear and the driven gear may be mechanically coupled by a belt. The electrical generating device may be a permanent magnet electrical generator. The electrical generating device may be an electromagnetic generator.

In some aspects, the wave energy conversion system may further include a wave measuring device fixedly secured to the platform structure. The wave measuring device may include a buoy partially disposed in the water. The buoy may be coupled to the propagating waves, thereby measuring the wave height and the period of the waves as they pass under the platform structure. The electromagnetic generator may vary its torque response based upon the measurements gathered by the wave measuring device.

In aspects, the hydraulic actuator may be a hydraulic rotary actuator, a hydraulic pump.

In some aspects, a plurality of pods may be rotatably supported on the platform structure.

In aspects, the wave energy conversion system may further include a hydraulic system, which may include a plurality of hydraulic circuits. Each of the plurality of hydraulic circuits may be mechanically coupled to a respective one of the plurality of pods. Each hydraulic circuit may contribute to the actuation of a hydraulic motor in mechanical communication with an electrical generator, thereby generating electrical energy.

In certain aspects, the multi-radius energy transmission mechanism may include a driven gear fixedly disposed on a drive-shaft extending through the center of rotation of the pod. Alternatively, the multi-radius energy transmission mechanism may include a driven gear rotatably supported on a post fixedly secured to an end surface defined on the pod.

In aspects, the wave energy conversion system may further include a ballasting system. The ballasting system may be configured to selectively submerge the wave energy system.

A further aspect of the disclosure is a method of converting wave energy into electrical energy is also provided in accordance with the present disclosure including providing a wave energy conversion system including a pod rotatably supported by a platform structure, a multi-radius energy transmission mechanism in mechanical communication with the pod, the multi-radius energy transmission mechanism configured to transmit a variable torque over a range of motion, and an electrical generating device in mechanical communication with the multi-radius energy transmission mechanism. The method further includes initiating rotation of the pod, thereby causing the multi-radius energy transmission mechanism to cause the electrical generating device to generate electricity.

In aspects, initiating rotation of the pod may include the multi-radius energy transmission mechanism imparting an increasing torque on the pod as the pod rotates from an initial position to a maximum position. Providing a wave energy conversion system may include the multi-radius transmission mechanism having a drive gear rotatably supported on the driveshaft and a driven gear rotatably supported on a post fixedly secured to the platform structure. Rotation of the pod may cause the drive gear to initiate rotation of the driven gear. Further, providing a wave energy conversion system may include the driven gear being in mechanical communication with the electrical generating device. Rotation of the pod may cause the electrical generating device to generate electricity.

In aspects, providing a wave energy conversion system may include the drive gear and driven gear having an elliptical profile. A radius of the drive gear may increase and a radius of the driven gear may decrease at a location adjacent to the interface of the drive gear and driven gear as the pod is rotated, thereby transmitting a variable torque.

BRIEF DESCRIPTION OF THE DRAWINGS

Various aspects and features of the present disclosure are described hereinbelow with references to the drawings, wherein:

FIG. 4 is a side view of the pod of FIG. 2, shown in a static position and illustrating a multi-radius energy transmission mechanism disposed thereon;

FIG. 4A is a side view of the pod of FIG. 4, shown in a maximum position;

FIG. 4B is a side view of another embodiment of the multi-radius energy transmission mechanism of FIG. 4;

DETAILED DESCRIPTION

Systems for converting energy from the wave patterns of a body of water into electrical energy are provided in accordance with the present disclosure and described in detailed below. However, these detailed embodiments are merely examples of the present disclosure, which may be embodied in various forms.

Figure 1:
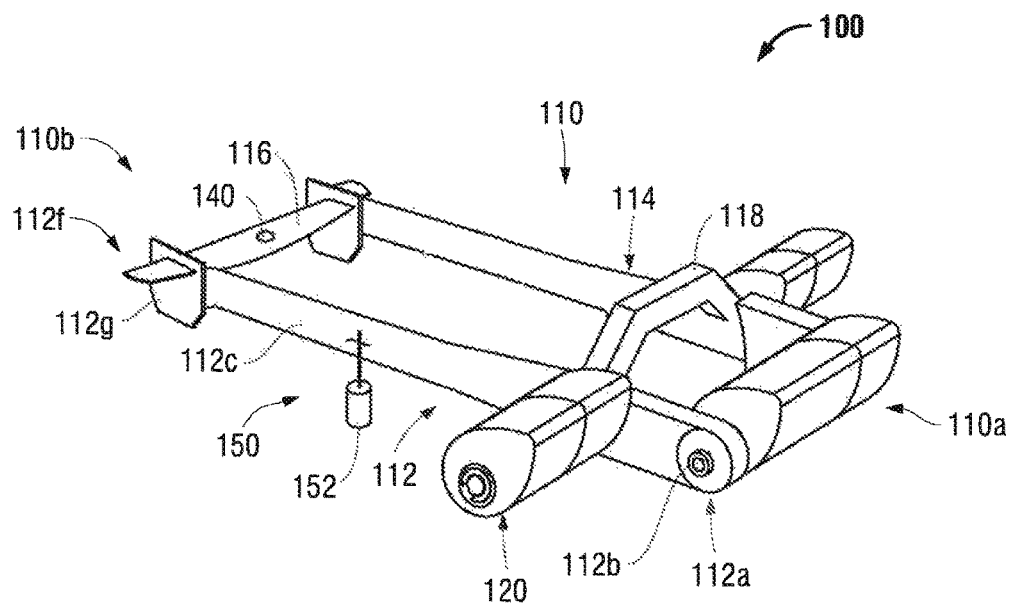
FIG. 1 is a perspective view of a system provided in accordance with the present disclosure capable of extracting energy from waves.

With reference to FIG. 1, a system provided in accordance with the present disclosure and configured for converting energy from the wave patterns of a body of water into electrical energy is shown generally identified by reference numeral 100. System 100 generally includes a platform structure 110 which is configured to be partially submerged within the ocean.

Platform structure 110 includes a plurality of elongate members 112 and 114 arranged in a parallel configuration. A stabilizing beam 116 is interposed between each of elongate members 112, 114 at a trailing or leeward end 110*b* and a connective beam 118 is interposed between each of elongate members 112, 114 at a leading or windward end 110*a*. Stabilizing beam 116 and connective beam 118 cooperate to provide transverse stability to platform structure 110 and maintain each of elongate members 112, 114 in a parallel configuration. Stabilizing beam 116 and connective beam 118 may be rigidly secured to each of elongate members 112, 114 using any suitable means, such as welding, adhesives, bolted connection, rivets, or the like.

As best illustrated in FIG. 1, elongate members 112, 114 include similar profiles, and therefore only one will be described herein in the interest of brevity. Elongate member 112 includes a generally oar shaped profile in order to further increase the stability of platform structure 110. In this manner, the windward end 112a of elongate member 112 includes an oval-shaped cross section 112b, reminiscent of that of the paddle portion of the oar. The oval-shaped cross section 112b transitions to a circular cross-section 112e in a leeward direction, although other suitable cross sections are also contemplated, such as square, octagonal, or the like. The circular cross section 112e includes an outer diameter that is less than that of oval-shaped cross section 112b and is reminiscent of the shank portion of an oar. A fin 112g is disposed on the leeward end 112f of elongate member 112 and extends in a leeward direction therefrom. Fin 112g includes a generally planar profile and includes a narrow cross section in a direction transverse to elongate body 112. Fin 112g includes an overall height greater than that of the outer diameter of circular cross section 112e such that a greater portion of fin 112g is submerged within the water than the remaining portions of platform structure 110. In this manner, the increased surface area of fin 112g submerged within the water provides a self-aligning capability that aligns platform structure 110 with the direction of wave propagation.

Figure 2:
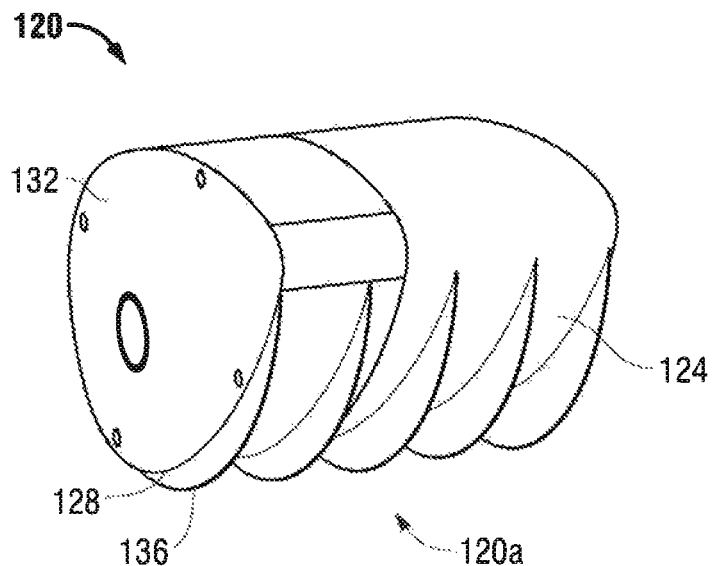
FIG. 2 is a perspective view of a pod of the system of FIG. 1.
Figure 3:
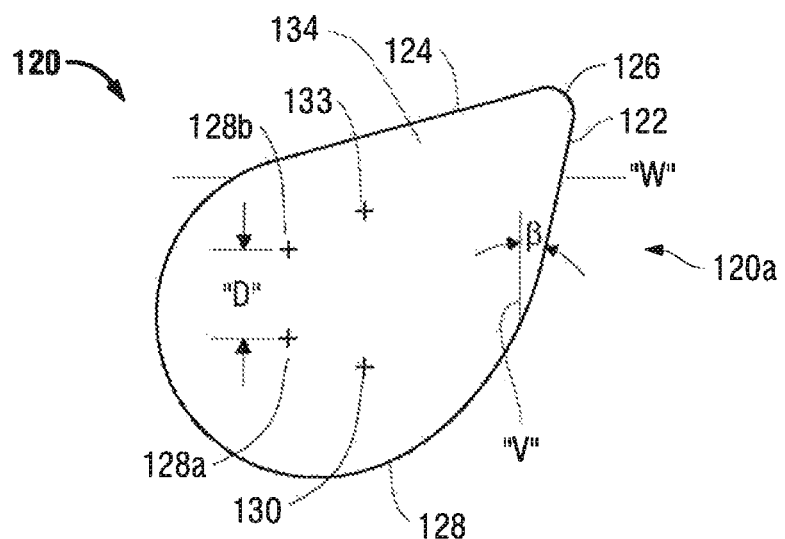
FIG. 3 is a side view of the pod of FIG. 2.

Referring now to FIGS. 2-8, an energy removing member or pod provided in accordance with the present disclosure is shown generally identified by reference numeral 120. As best illustrated in FIG. 3, pod 120 includes a generally tear drop or egg shaped profile; however, other profiles are also contemplated as it has been found that the shape of pod 120 can significantly impact the energy removing capability (i.e., the efficiency) of the system. As best illustrated in FIG. 3, pod 120 includes a pair of planar side surfaces 122, 124 disposed in spaced relation to each other and oriented such that an upper end of each of planar side surfaces 122, 124 intersect to form an apex 126. Although generally shown as having an arcuate profile, apex 126 may include any suitable profile such as pointed, planar, or the like. Planar side surface 122 forms an angle β with respect to a vertical axis "V" of approximately 15 degrees, although other angles are also contemplated. Although generally shown as being disposed in a mirrored fashion, i.e., planar side surfaces 122, 124 form an equal angle with respect to an axis defined through apex 126, it is contemplated that planar side surface 122 may diverge at a greater angle than planar side surface 124, or vice versa.

Planar side surface 122 is disposed on a leading or windward side 120a of pod 120 and transitions into a circular or arcuate profile 128 having a decreasing radius and extending towards and eventually joining planar side surface 124 disposed on a trailing or leeward side 120b of pod 120. In this manner, the length of planar side surface 122 is shorter than that of planar side surface 124. As best illustrated in FIG. 3, the center of the initial radius of arcuate profile 128 is located at point 128a and the final radius of arcuate profile 128 is located at point 128b, located a distance "D" above point 128a that is ½ the initial radius of arcuate profile 128. This configuration provides a centroid or center of gravity 130 that is below the center of rotation of pod 120, which is located at point 128a, while also providing a center of buoyancy 133 that is above the center of rotation 128a of pod 120. In combination, the geometry of the center of rotation 128a, center of gravity 130, and center of buoyancy 133 cause pod 120 to statically float in the water "W" such that planar side surface 122 intersects the water's surface at an angle of approximately 75 degrees (i.e., 15 degrees from vertical). It is contemplated, however, that the various geometries discussed above may be altered, depending on the materials used to construct pod 120, the mechanical elements disposed within pod 120, and other considerations that impact the mass, buoyancy, and the location of center of gravity of pod 120.

FIG. 4 illustrates pod 120 in a first, static, position including a multi-radius energy transmission mechanism or transmission 200 capable of transmitting variable torque over a range of motion. The specific geometry of the components of transmission 200 enables pod 120 to efficiently extract energy from the waves. Scientific testing has revealed that the energy contained by a wave depends on the period between each crest of a wave and the height of each wave. A mathematical formula illustrating this relationship is:

$$P = \frac{\rho \cdot g^2}{64 \cdot \pi} \cdot H_{m0}^2 \cdot T_e;$$

where P is the wave energy flux per unit of wave-crest length, $\rho$ is the density of the water; g is the gravitational constant, $H_{m0}$ the significant wave height, and $T_e$ is the wave energy period. Thus, effective coupling of the pod 120 to the waves involves the angle of pod 120 in relation to the waves, the significant wave height, and the wave energy period.

When pod 120 is in a first, static, position (FIGS. 4 and 5A), the waves impart a small amount of force upon pod 120, thereby imparting a proportionally small amount of torque about point 128a. Therefore, the resistance against rotation about point 128a provided by transmission 200 must be low in order to permit pod 120 to rotate about point 128a and thereby generate energy. As pod 120 is caused to further rotate (FIG. 5B), the amount of force imparted by the waves increases with the amount of surface area of the windward side 120a of pod 120 that is exposed, thereby increasing the amount of torque generated about point 128a until pod 120 reaches a maximum angle of rotation (FIGS. 4A and 5C) at which point the torque generated is at its maximum. Therefore, as pod 120 is further rotated about point 128a from its static position, the resistance against rotation about point 128a provided by transmission 200 must also increase. Thus, the greater the wave height and the longer the period of the wave energy, the further pod 120 will rotate, and thus the greater the amount of counter torque will be required. As will be discussed below, transmission 200 provides a variable torque response as pod 120 is caused to rotate about point 128a.

Referring now to FIG. 2, pod 120 includes a side cover or transmission cover 132 releasably secured to an end surface 134 (FIG. 3) defined by the perimeter of pod 120 (i.e., planar side surfaces 122, 124, apex 126, and arcuate profile 128, as illustrated in FIG. 3). Side cover 132 is releasably secured to end surface 134 using any suitable means, such as bolts, latches, quick release fasteners, or the like. Although generally shown as having a profile complimentary to that of pod 120, it is contemplated that side cover 132 may include any profile necessary to cover transmission 200 and shield transmission 200 from water or other elements. It is contemplated that side cover 132 may provide a water-tight seal against end surface 134 in order to inhibit water from contacting transmission 200.

A plurality of fins 136 are fixedly secured to the windward side 120a of pod 120 extending along planar side surface 124 and arcuate profile 128. Fins 136 increase the efficiency of pod 120 by capturing wave energy travelling at an oblique angle relative to the center of rotation 128a of pod 120.

As illustrated in FIG. 4, transmission 200 includes a drive gear 202 fixedly disposed on a driveshaft (not shown) extending through the center of rotation 128a of pod 120, such that pod 120 is rotatably supported thereon. Drive gear 202 may be fixedly secured to the driveshaft using any suitable means, such as splines, friction fit, adhesives, or the like. The driveshaft is fixedly secured platform structure 110 and extends through pod 120 and extends past end surface 134. Drive gear 202 is secured to the driveshaft at a point other than the geometric center of drive gear 202 such that drive gear 202 remains stationary as pod 120 rotates about the driveshaft.

An intermediate or driven gear 204 is rotatably supported on a post or spindle (not shown) that is fixedly disposed on end surface 134 in a cantilever fashion, although it is contemplated that the post may be supported on a first end by end surface 134 and on a second end by side cover 132 (FIG. 2). Driven gear 204 is rotatably supported on the post by any suitable means, such as bearings, bushings, or the like. Alternatively, it is contemplated that the post may be rotatably supported by end surface 134 and may include torque transferring features (not shown), such as a plurality of splines or the like, that interface with complementary torque transmitting features disposed on driven gear 204. As can be appreciated, driven gear may alternatively be fixedly secured to the post using friction fit, press fit, or other suitable means capable of transmitting torque from the post to driven gear 204. Driven gear 204 is disposed on the post at a location 204a other than its geometric center such that the driven gear 204 rotates about the post in an eccentric manner as driven gear 204 is caused to be rotated by drive gear 202. In this manner, driven gear 204 rotates about drive gear 202 in a planetary fashion. The eccentric rotation of driven gear 204, coupled with the eccentric mounting of drive gear 202, ensures that each of driven gear 204 and drive gear 202 remain in mechanical communication as pod 120 is caused to be rotated by wave energy. In this manner, the relative centers of rotation of drive gear 202 and driven gear 204 remain constant as pod 120 rotates about center of rotation 128a while the torque transfer between drive gear 202 and driven gear 204 varies with continued rotation of pod 120.

Figure 5A:
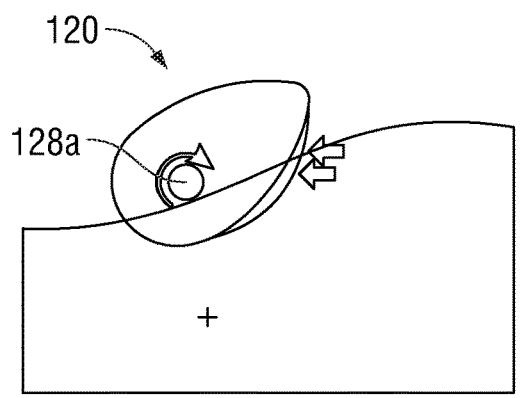
FIG. 5A is a side view of the pod of FIG. 2, shown in a static position as a wave impacts the pod.
Figure 5B:
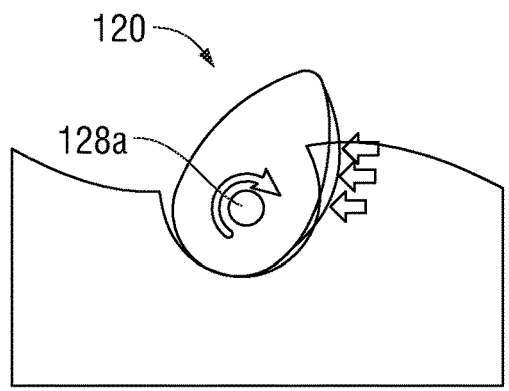
FIG. 5B is a side view of the pod of FIG. 5A, shown in an intermediate position as the wave causes the pod to rotate.
Figure 5C:
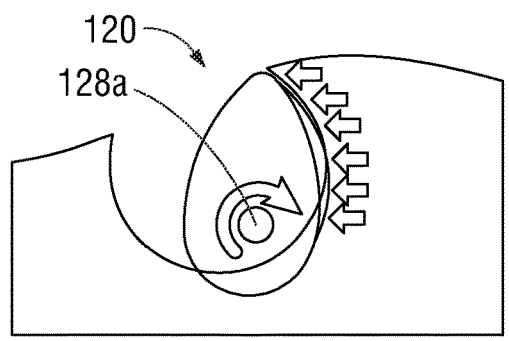
FIG. 5C is a side view of the pod of FIG. 5A, shown in a maximum position as the pod is further rotated by the wave.

As illustrated in FIG. 4, in a first, static position, drive gear 202 and driven gear 204 are disposed about their respective points of rotation, 128a, 204a, such that the radius between point 128a and the interface between drive gear 202 and driven gear 204 is a minimum value 202a, and the radius between location 204a and the interface between drive gear 202 and driven gear 204 is a complimentary maximum value 204b. As pod 120 is caused to be rotated by the waves, the radius between point 128a and the interface between drive gear 202 and driven gear 204 increases, whereas the radius between location 204a and the interface between drive gear 202 and driven gear 204 decreases, thereby providing a variable torque response against the torque generated by the waves through the counterclockwise motion of the pod 120 (i.e., the resistance to rotation increases as pod 120 is rotated counterclockwise). Ultimately, as illustrated in FIGS. 4A and 5C, when pod 120 is caused to rotate to a maximum position (i.e., the position generating maximum torque), drive gear includes a maximum radius 202b and driven gear includes a complimentary minimum radius 204c. As can be appreciated, the radius of each of drive gear 202 and driven gear 204 is continuously variable through the rotation of pod 120, thereby maintaining mechanical communication therebetween (i.e., the gear teeth (not shown) of each maintain a proper mesh throughout the range of rotation of pod 120).

Referring again to FIG. 4, a spur gear 206 is rotatably disposed on the post (i.e., the same post on which driven gear is disposed) such that spur gear 206 rotates about its geometric center. Spur gear 206 is fixedly secured to driven gear 204 by any suitable means (i.e., bolted connection, nested configuration using friction fit, press fit, cogs, etc.), such that spur gear 206 rotates in unison with driven gear 204 (i.e., the torque from driven gear 204 is imparted on spur gear 206). In the instance where driven gear 204 is fixedly secured to the post, spur gear 206 includes complimentary torque transmitting features to those of the post. In this manner, similarly to above, spur gear 206 and driven gear 204 rotate in unison. It is contemplated that spur gear 206 may be mechanically coupled to driven gear 204 using a one way clutch or other suitable device such as a ratcheting mechanism. In this manner, spur gear 206 is only driven by driven gear 204 in a first direction (i.e., as pod 120 is caused to rotate from an initial position to its maximum position), and is decoupled from driven gear in a second direction (i.e., as pod 120 returns to its initial position).

An electrical generating device or generator 220 is disposed within end surface 134 of pod 120. Generating device 220 may be any suitable generating device such as a permanent magnet electrical generator, electromagnetic generator, hydraulic rotary actuator, hydraulic pump, or the like. Generator 220 includes a pinion gear 222 in mechanical cooperation with spur gear 206, such that as spur gear 206 is rotated, pinion gear 222 is likewise rotated, thereby generating electrical energy. It is contemplated that driven gear 204, and therefore, spur gear 206, may include a one way clutch, or one way clutch bearing (not shown) disposed thereon. In this manner, the generating device is only driven when pod 120 is caused to be rotated from its initial position (FIG. 4) to its final position (FIG. 4A). As pod 120 returns to its initial position, the one way clutch permits driven gear 204, and thereby spur gear 206, to remain stationary and thereby not transfer any torque to generating device 220.

Figure 8:
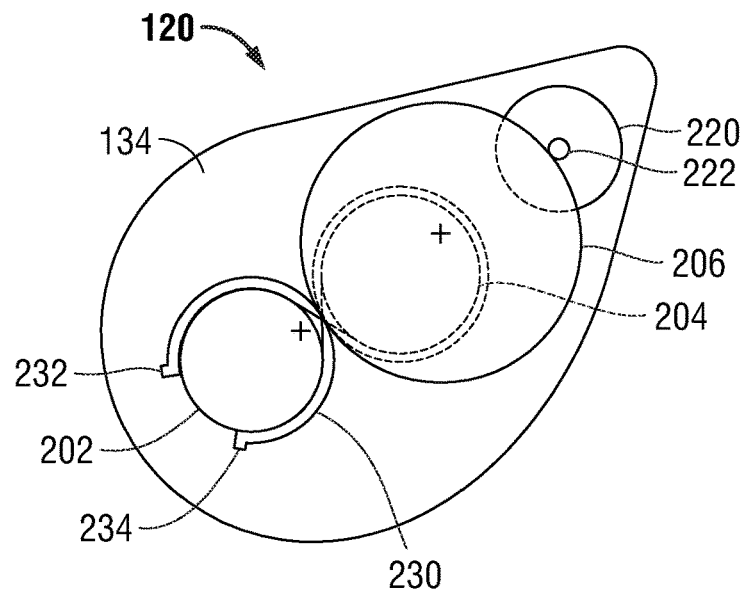
FIG. 8 is a side view of the pod of FIG. 2, illustrating still another multi-radius energy transmission mechanism.

Although generally described above as utilizing a series of gears, it is contemplated that transmission 200 may utilized any suitable means to provide a varying torque response over a range of motion, such as belts (FIG. 8), friction drive, viscous couplings, or the like. With reference to FIG. 8, in the instance where a belt is utilized to transmit the varying torque response between drive gear 202 and driven gear 204, it is contemplated that the belt may be continuous or may terminate on drive gear 202. In this manner, a belt 230 is secured on each end by suitable fastening devices 232, 234, which are fixedly secured to an outer circumference of drive gear 202. This configuration limits the rotation of pod 120 from its first, static position (FIG. 5A) to its maximum, or vertical position (FIG. 5C), although it is contemplated that pod 120 may rotate 360 degrees in the instance where a continuous belt is utilized.

Figure 6:
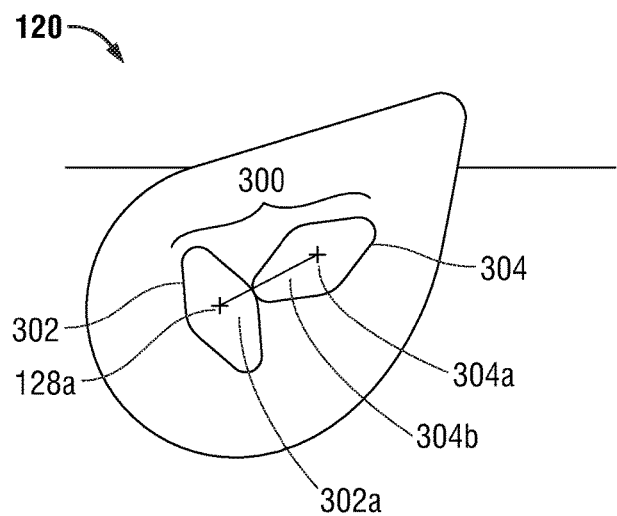
FIG. 6 is a side view of the pod of FIG. 2, illustrating another multi-radius energy transmission mechanism.

Referring now to FIG. 6, an illustration of another transmission provided in accordance with the present disclosure is provided and generally referred to by reference numeral 300. Transmission 300 is similar to that of transmission 200, described above, and therefore in the interest of brevity, only the differences therebetween will be described below. Transmission 300 includes an elliptical drive gear 302 and a corresponding elliptical driven gear 304. Elliptical drive gear 302 is rotatably supported on the driveshaft (not shown) at point 128a such that elliptical drive gear 302 rotates concentrically thereabout (i.e., elliptical drive gear 302 is not eccentrically disposed on the driveshaft). Similarly, elliptical driven gear 304 is rotatably supported on the post (not shown) at point 304*a* such that elliptical driven gear 304 rotates concentrically thereabout (i.e., elliptical driven gear 304 is not eccentrically disposed on the post). Elliptical drive gear 302 and elliptical driven gear 304 are oriented such that when pod 120 is in its initial position (FIG. 4), the short axis 302*a* of elliptical drive gear 302 interfaces with the long axis 304*b* of elliptical driven gear 304. In this manner, transmission 300 provides a similar effect of that of transmission 200; however, transmission 300 permits pod 120 to rotate a full 360 degrees about point 128*a* while maintaining constant contact between elliptical drive gear 302 and elliptical driven gear 304.

Figure 7:
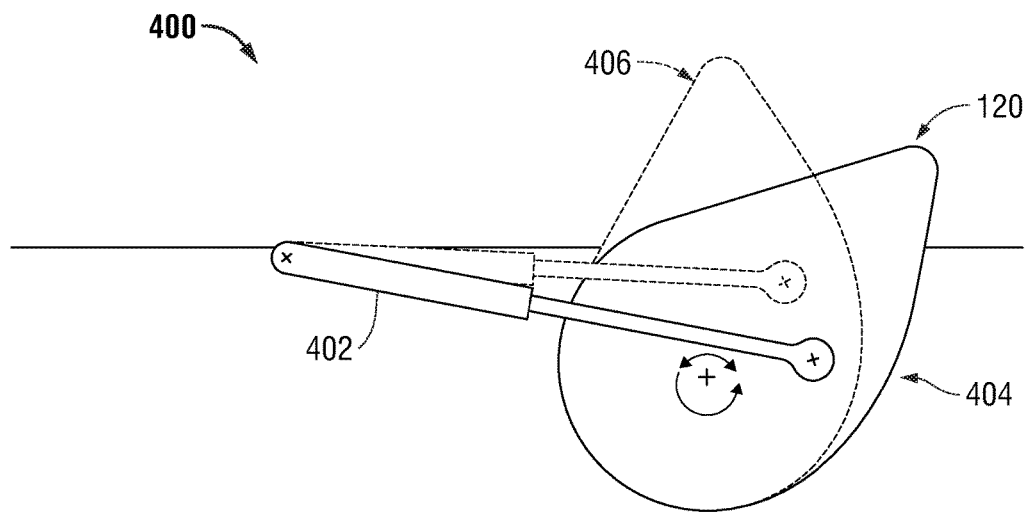
FIG. 7 is a side view of the pod of FIG. 2, illustrating yet another multi-radius energy transmission mechanism.

FIG. 7 illustrates another embodiment of a system provided in accordance with the present disclosure and configured for converting energy from the wave patterns of a body of water into electrical energy is shown generally identified by reference numeral 400. System 400 is similar to that of system 100, discussed above, and therefore in the interest of brevity, only the differences therebetween will be discussed below. A hydraulic actuator 402 is rotatably secured to platform structure 110 on a first end and rotatably secured to pod 120 on a second end. In this manner, when pod 120 is in a first, static position 404, the hydraulic actuator 402 is fully extended. As pod 120 is caused to rotate about point 128*a*, the hydraulic actuator is caused to compress, thereby driving hydraulic fluid (not shown) through the hydraulic system (not shown), until pod 120 reaches a second, final position 406. In this manner, hydraulic actuator 402 provides an increased resistance to the rotation of pod 120 as pod 120 is caused to rotate from the first position to the second position, similarly to the variable torque response discussed above with respect to system 100. As the wave passes pod 120 and pod 120 is permitted to return to its first position 404, thereby causing the hydraulic actuator 402 to expand. This motion causes hydraulic actuator 402 to pump hydraulic fluid through the hydraulic system, thereby generating electrical energy.

Referring back to FIG. 1, a plurality of pods 120 is rotatably supported on windward end 110*a* of platform structure 110. Pods 120 are interposed between elongate members 112, 114 of platform structure 110 and are disposed on the outside of each of elongate members 112, 114. Pods 120 that are disposed outside of elongate members 112, 114, are rotatably supported on a driveshaft that is aligned with connective beam 118, thereby maintaining the lateral stiffness of platform structure 110. As can be appreciated, each of the plurality of pods 120 may be supported by means of bearings, bushings, or the like. It is further contemplated that each of the plurality of pods 120 may be fixedly secured to a driveshaft (not shown) that is rotatably supported within each of elongate members 112, 114 using any suitable means, such as bearings, bushings, or the like. In this manner, the driveshaft rotates contemporaneously with each of pods 120. Further, it is contemplated that transmission 200 may be disposed within or on elongate members 200, thereby allowing pods 120 to be easily removed from platform structure 110 for service or other needs, as best illustrated in FIG. 4B. In this manner, drive gear 202 is fixedly secured to pod 120 such that pod 120 and drive gear 202 rotate in unison. A further benefit of transmission 200 being disposed remote from pod 120 is that generating device 220 may be disposed at a location more suitable for a large or heavy device, such as in the case of a hydraulic motor or the like. It is contemplated that generating device 220 may be in mechanical communication with spur gear 206 via a belt, chain, or other suitable drive-line device. Further benefits of transmission 200 being disposed remote from pod 120 include reduced complexity of pod 120, thereby allowing for easier manufacturing of pod 120, and enabling platform structure 110 to be better balanced, since the heavy components of transmission 200 are maintained in a stationary location relative to platform structure 110. This configuration reduces the stresses acting on transmission 200 and therefore allows for smaller components to be used, longer service intervals, and increased efficiency of energy generation.

Figure 1A:
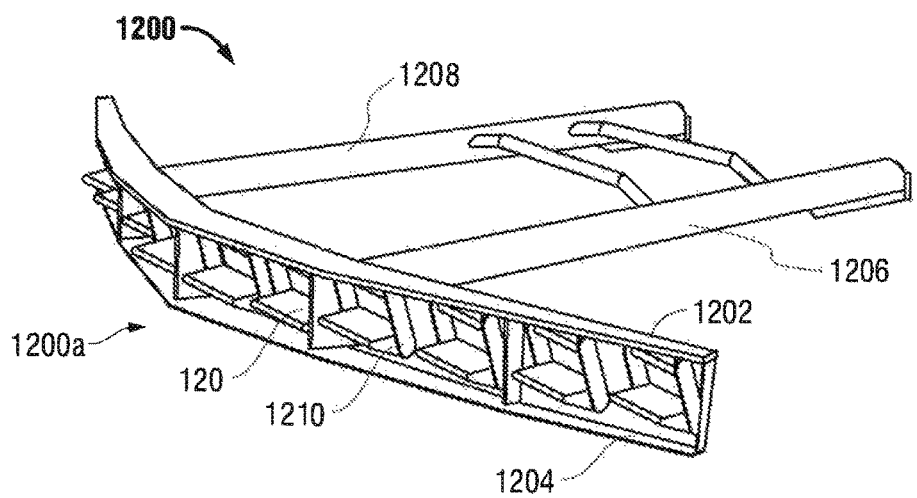
FIG. 1A is a perspective view of another system provided in accordance with the present disclosure capable of extracting energy from waves.

Another platform structure suitable for use with pods 120 is illustrated in FIG. 1A and generally referred to by reference numeral 1200. Platform structure 1200 is generally similar to that of platform structure 110, and therefore only the differences therebetween will be described in the interest of brevity. A windward end or leading end 1200*a* of platform structure 1200 includes a pair of elongate beams 1202, 1204 extending in a transverse direction to elongate members 1206 1208. Elongate beams 1202, 1204 are arranged in a stacked orientation and include an arcuate profile when viewed from above. A plurality of U-shaped frames 1210 are interposed between each of elongate beams 1202, 1204 and are fixedly secured to an underside of elongate beam 1202. In this manner, the U-shaped frames 1210 are oriented in an upside down fashion, such that a pod 120 may be rotatably secured therein. This configuration enables a large number of pods 120 to be secured to platform structure 1200 while maintaining the stability of platform structure 1200 in the water. While FIGS. 1 and 1A depict specific examples of implementation of the current disclosure, they should not be found limiting, but instead those of skill in the art will understand that the pods 120 may be deployed on a variety of structures of varying sizes without departing from the scope of the present disclosure.

Figure 9:
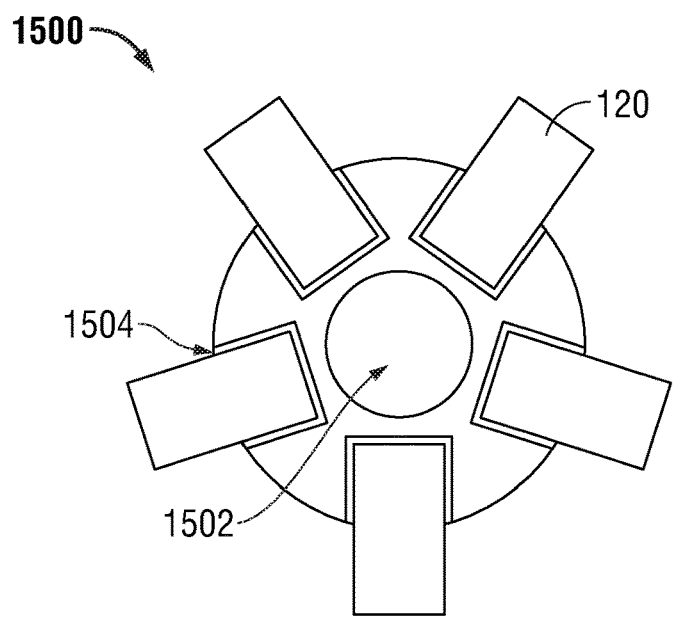
FIG. 9 is a plan view of a platform structure including a plurality of pods rotatably supported thereon.

FIG. 9 illustrates another platform structure incorporating the use of a plurality of pods 120, generally referred to by reference numeral 1500. Platform structure 1500 includes a generally circular configuration and include a lumen 1502 defined therethrough. A plurality of cutouts 1504 are defined through upper and lower ends of platform structure 1500, each of cutouts 1504 including a pod 120 rotatably supported therein. Platform structure 1500 may include any or all of the features described above and may be free floating or may be secured to a pylon of a dock, oil rig, or a buoy for example via a tether.

Figure 10:
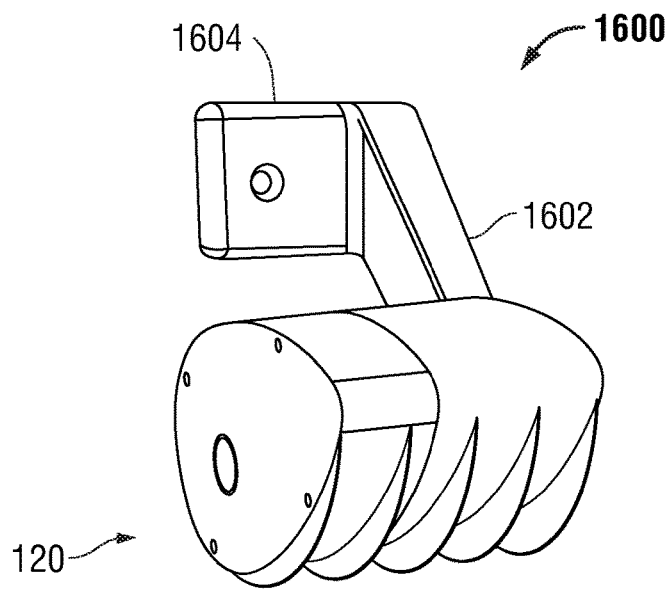
FIG. 10 is a perspective view of another platform structure including a pod rotatably supported thereon.

With reference to FIG. 10, yet another platform structure incorporating the use of a pod 120 is illustrated generally referred to by reference numeral 1600. Platform structure 1600 includes an arm 1602 having a pod 120 rotatably secured thereto on a first end, and a plate 1604 fixedly secured thereto on a second end. It is contemplated that arm 1602 and plate 1604 may be integrally formed. Plate 1604 is configured to be rigidly secured by any suitable means (e.g., bolted connection, adhesives, or the like) to a large object such as a boat, dock, buoy, or the like. Arm 1602 and plate 1604 may be formed from any suitable material having sufficient rigidity to support pod 120 and to resist corrosion, such as stainless steel, cobalt chrome, composites, polymers, or the like. As can be appreciated, platform structure 1600 may include any or all of the features described above.

Figure 11:
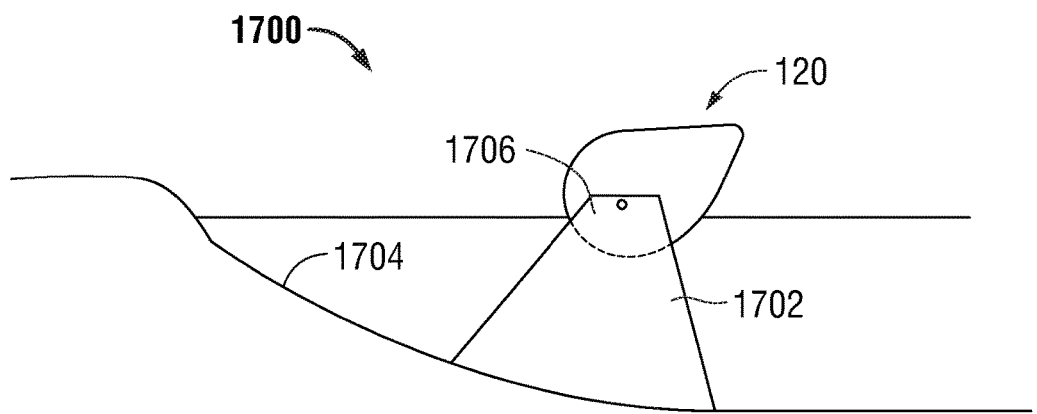
FIG. 11 is a side view of still another platform structure including a pod rotatably supported thereon.

Turning now to FIG. 11, still another platform structure incorporating the use of a pod 120 is illustrated generally referred to by reference numeral 1700. Platform structure 1700 is similar to platform structure 1600, except arm 1702 is rigidly fixed to the seabed 1704 close to shore, thereby minimizing the size of platform structure 1700. It is contemplated that pod 120 may be rotatably supported by arm 1702 in a cantilever manner or arm 1702 may include a pair of tabs 1706 extending vertically therefrom such that a driveshaft (not shown) rotatably supporting pod 120 maybe supported on either end. As can be appreciated, platform structure 1700 may include any or all of the features described above.

It is contemplated that system 100 may include a beacon 140 disposed thereon. Although generally shown as being disposed on stabilizing beam 116, it is contemplated that beacon 140 may be disposed at any suitable location on platform structure 110 or separated therefrom (for example on a platform extending away from the platform to windward. Beacon 140 may be any suitable device capable of transmitting and receiving information regarding oceanic events, such as tides, wave height, the presence of storms, etc. Beacon 140 may include a suitable computer (not shown) capable of executing a program stored on a suitable storage medium (not shown), such as flash memory, a hard drive, or the like. Beacon 140 includes a global positioning system (GPS) such that beacon 140 may transmit the location of beacon 140 to enable oceanic information to be transmitted wireless thereto in order to cause system 100 to adjust to the oceanic conditions at that particular location. In addition, beacon 140 may instruct a ballasting system 1300 (FIGS. 19A and 19B) to cause system 100 to submerge ahead of a storm or other event that may imperil system 100, as will be discussed in further detail below.

Continuing with FIG. 1, system 100 further includes a wave measuring device 150 rigidly secured to platform structure 110. Wave measuring device 150 includes a buoy 152 slidably or rotatably disposed thereon that is partially submerged in the water. Buoy 152 is buoyant, and therefore is coupled to the water such that it follows the waves as they pass under platform structure 110. In this manner, buoy 152 measures the instantaneous wave height and wave period of the waves passing under platform structure 110. This information is stored in a suitable storage medium of a computer (not shown) containing an executable program capable of receiving the data, interpreting the data, and sending commands.

The wave height and wave period measurements are used to determine whether ballasting system 1300 (FIGS. 19A and 19B) should submerge system 100, as will be discussed in further detail below. It is further contemplated that wave measuring device 150 may be used to instantaneously adjust an electromagnetic generator (not shown) disposed in pod 120 in lieu of generator 220 or transmission 200. In this manner, the electromagnetic generator may be in mechanical cooperation with drive gear 202, and the torque response provided by the electromagnetic generator may be increased or decreased as a result of the measurements gathered by wave measuring device 150.

Figure 12:
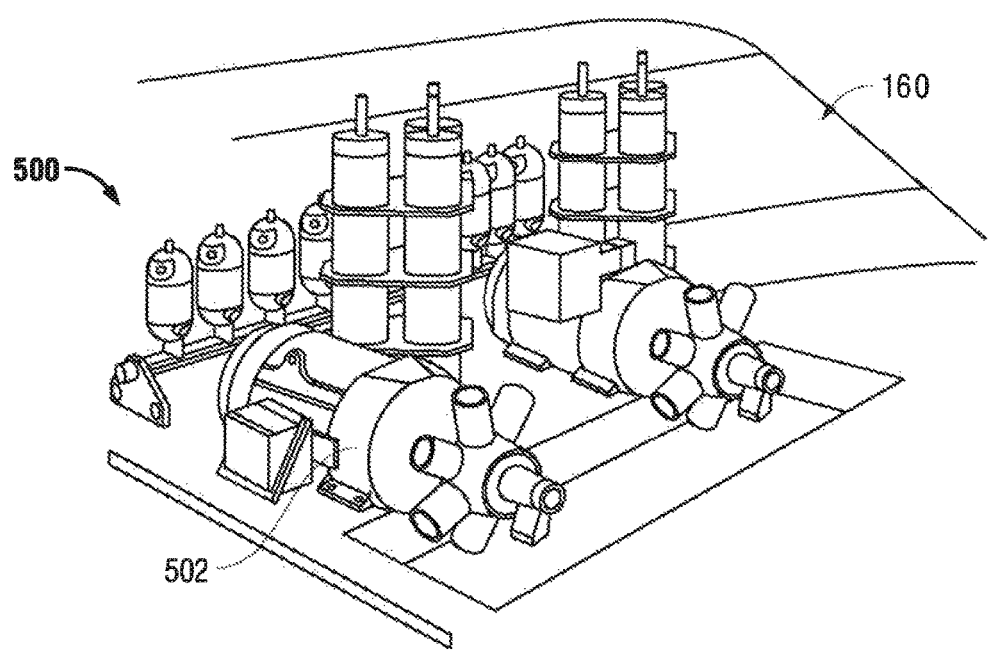
FIG. 12 is a perspective view of the system of FIG. 12, illustrating a head of the platform structure including a hydraulic system disposed therein.

With reference to FIG. 12, an illustration of a hydraulically actuated electrical generation system 500 provided in accordance with the present disclosure. Although generally shown as being disposed in a head 160 disposed on platform structure 110, electrical generation system 500 may be disposed in any suitable location, whether on platform structure 110, within platform structure 110, or remote from platform structure 110. Each pod 120 includes a corresponding electrical generation system 500, although other configurations are also contemplated, such as coupling one or more pods 120 to a single electrical generator 502.

Figure 13:
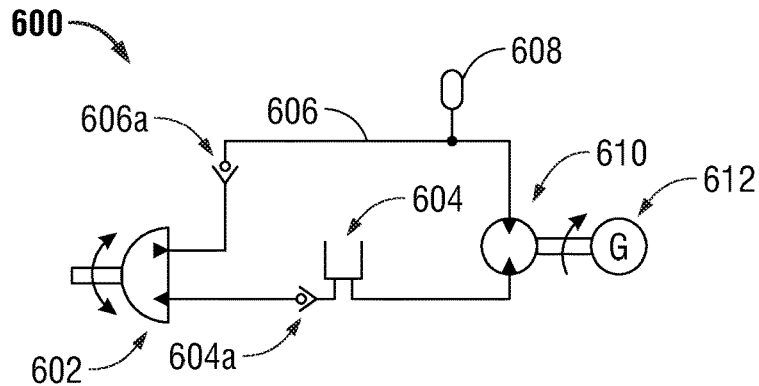
FIG. 13 is a schematic view of a hydraulic circuit provided in accordance with the present disclosure.
Figure 13A:
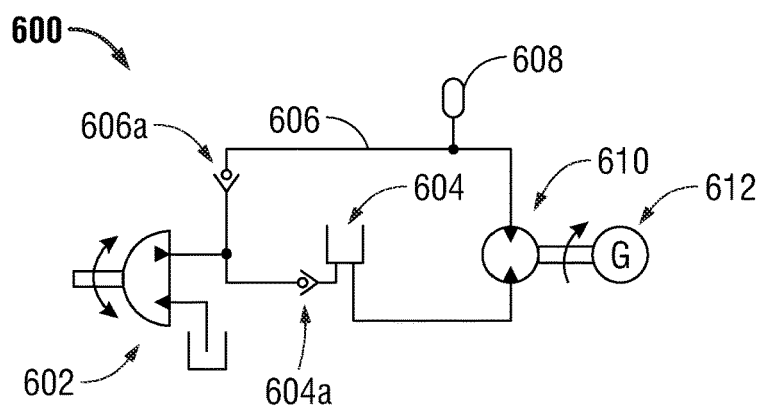
FIG. 13A is a schematic view of an alternate embodiment of the hydraulic circuit of FIG. 13.

A schematic of a hydraulic circuit 600 is illustrated in FIG. 13 corresponding to a pod 120 including a hydraulic rotary actuator 602. Hydraulic rotary actuator 602 may be any suitable rotary actuator known in the art, such as a rack and pinion, vane, or the like. An input shaft (not shown) of hydraulic rotary actuator 602 is fixedly secured to pinion gear 222, thereby being in mechanical communication with transmission 200. Hydraulic rotary actuator 602 is hydraulically coupled to a fluid source 604 having a first one way valve 604a. First one way valve 604a is configured to permit the passage of fluid only out of fluid source 604 and into hydraulic rotary actuator 602, such that hydraulic rotary actuator 602 may only draw fluid therein, and not expel fluid back into fluid source 604. A hydraulic line 606 is hydraulically coupled to hydraulic rotary actuator 602 and includes a second one way valve 606a in hydraulic communication therewith. Second one way valve 606a is configured to permit the passage of fluid from hydraulic rotary actuator 602, and prohibit fluid from being drawn back into hydraulic rotary actuator 602. An accumulator 608 is also disposed on hydraulic line 606 and is in hydraulic communication therewith. Accumulator 608 is disposed downstream of second one way valve 606a. Continuing further downstream, a hydraulic motor 610 is disposed on hydraulic line 606 and is in hydraulic communication therewith. Hydraulic motor 610 is hydraulically coupled to fluid source 604, such that any fluid drawn in by hydraulic rotary actuator 602 is expelled into fluid source 604 after passing therethrough. The combination of the first and second one way valves 604a, 606a, ensures that the fluid may only be forced into the hydraulic motor 610, and not back into the fluid source 604. In this manner, the fluid is pressurized between the hydraulic rotary actuator 602 and the hydraulic motor 610, thereby causing the hydraulic motor 610, and in turn an electrical generator 612 (or electrical generator 502 of FIG. 12) mechanically coupled to an output shaft (not shown) of the hydraulic motor 610, to rotate, thereby generating electrical energy. The low pressure fluid expelled from the hydraulic motor is then returned to the fluid source 604. An alternative hydraulic circuit 600 is illustrated in FIG. 13A.

Figure 14:
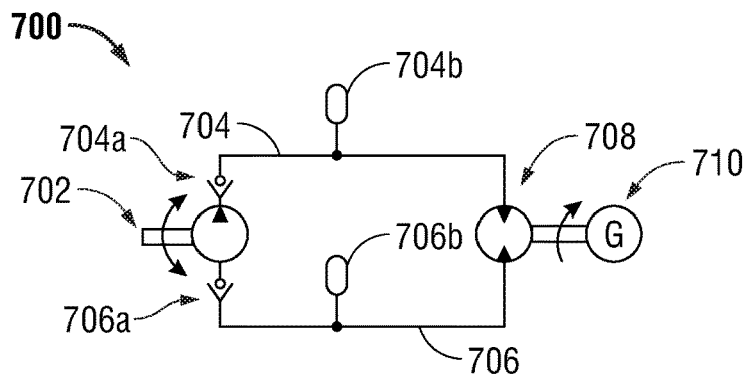
FIG. 14 is schematic view of another hydraulic circuit provided in accordance with the present disclosure.

Referring now to FIG. 14, another hydraulic schematic is provided illustrating hydraulic circuit 700 is provided. Hydraulic circuit 700 corresponds to system 100 including a hydraulic pump 702 mechanically coupled to transmission 200. In this manner, pinion gear 222 is fixedly disposed on an output shaft (not shown) of hydraulic pump 702. Hydraulic system 700 includes a high pressure line 704 hydraulically coupled to a high pressure side of hydraulic pump 702 and terminating in a high pressure side of hydraulic motor 708. High pressure line 704 includes a first one way valve 704a disposed upstream of a high pressure or first accumulator 704b. A low pressure line 706 is hydraulically coupled to a low pressure side of hydraulic motor 708 and terminates at a low pressure side of hydraulic pump 702. Low pressure line 706 includes a low pressure or second accumulator 706b disposed upstream of a second one way valve 706a. Hydraulic system 700 is a closed loop system and therefore, the combination of first and second one way valves 704a, 706a, causes the fluid to only flow in a direction from hydraulic pump 702 to hydraulic motor 708. In this manner, hydraulic pump causes the fluid in high pressure line 704 to increase in pressure and drive hydraulic motor 708, and in turn an electrical generator 710 (or electrical generator 502 of FIG. 12) mechanically coupled to an output shaft (not shown) of the hydraulic motor 708, thereby generating electrical energy. The low pressure fluid expelled by hydraulic motor 708 is returned to hydraulic pump 702 via low pressure line 706, thereby completing the hydraulic loop.

Figure 15:
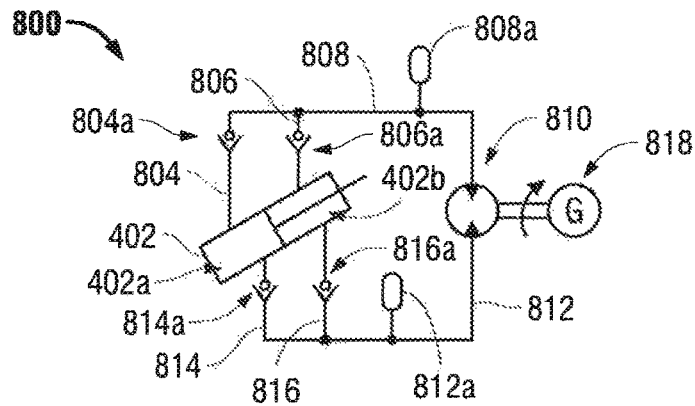
FIG. 15 is schematic view of still another hydraulic circuit provided in accordance with the present disclosure.

FIG. 15 illustrates yet another hydraulic circuit 800 provided in accordance with the present disclosure. Hydraulic circuit 800 corresponds to system 400 including a hydraulic actuator 402, which may be any suitable linear hydraulic actuator. A first high pressure line 804 is hydraulically coupled to a first chamber 402a of hydraulic actuator 402, and a second high pressure line 806 is hydraulically coupled to a second chamber 402b. Each of high pressure lines 804, 806 includes a corresponding first and second one way valve 804a, 806a, configured to permit fluid flow only in a direction flowing away from hydraulic actuator 402. High pressure lines 804, 806 converge into a high pressure hydraulic conduit 808 that terminates in at a high pressure end of a hydraulic motor 810. High pressure conduit 808 includes a high pressure or first accumulator 808a disposed between hydraulic motor 810 and first and second one way valves 804a, 806a. A low pressure conduit 812 is hydraulically coupled to a low pressure side of hydraulic motor 810 and diverges into a first low pressure line 814 and a second low pressure line 816. First low pressure line 814 is hydraulically coupled to first chamber 402a of hydraulic actuator 402 and second low pressure line 816 is hydraulically coupled to second chamber 402b of hydraulic actuator 402. Each of first and second low pressure lines 814, 816 includes a corresponding third and fourth one way valve 814a, 816a, configured to permit fluid flow only in a direction flowing into hydraulic actuator 402. Low pressure conduit 812 includes a low pressure or second accumulator 812a disposed thereon between hydraulic motor 810 and first and third and fourth one way valves 814a, 816a. The rotation of pod 120, and therefore the compression and extension of hydraulic actuator 402, pressurizes the fluid contained within system 800, drives the hydraulic motor 810, and in turn drives an electrical generator 818 (or electrical generator 502 of FIG. 12) mechanically coupled to an output shaft (not shown) of the hydraulic motor 810, thereby generating electrical energy. The low pressure fluid expelled by hydraulic motor 810 is returned to the low pressure side of the hydraulic actuator 402 via low pressure conduit 812, thereby completing the hydraulic loop.

As noted above, it is contemplated that one or more pods 120 may be included in system 100. As can be appreciated, each pod 120 may include a single hydraulic circuit (i.e., hydraulic circuits 600, 700, 800 discussed above) including a single electrical generator, or the hydraulic circuits of a plurality of pods 120 may be hydraulically coupled to form a single hydraulic circuit driving a single electrical generator.

Figure 16:
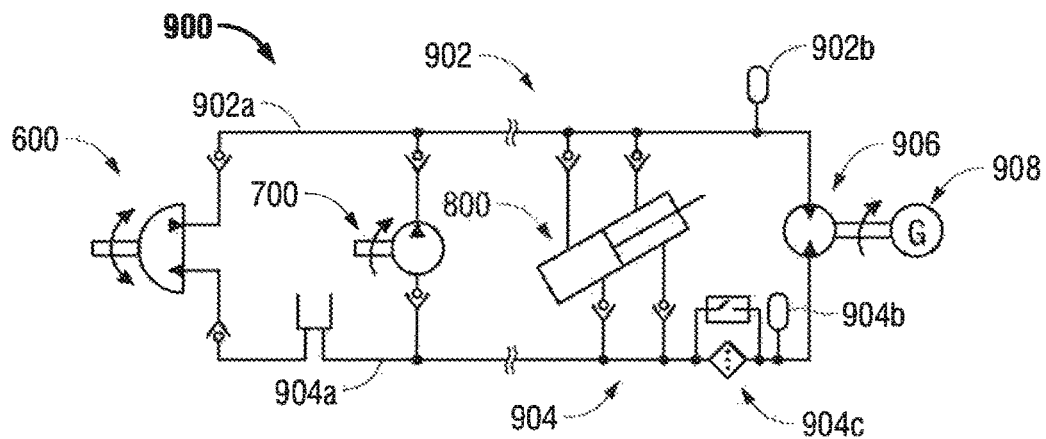
FIG. 16 is a schematic view of a hydraulic system provided in accordance with the present disclosure, including the hydraulic circuits of FIGS. 13, 14, and 15.
Figure 16A:
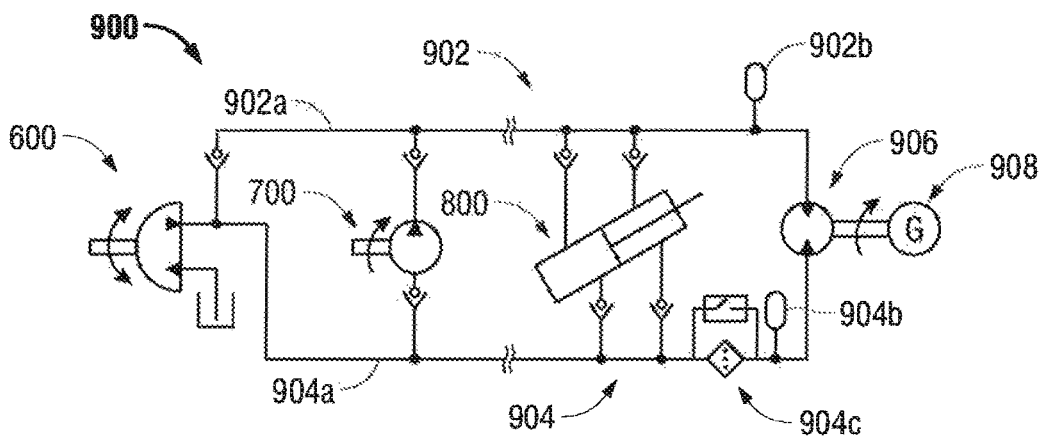
FIG. 16A is a schematic view of an alternate embodiment of the hydraulic system of FIG. 16.

FIG. 16 illustrates a hydraulic system 900 including a plurality of pods 120, and therefore a plurality of hydraulic circuits. Although shown with three hydraulic circuits, it is contemplated that any number of hydraulic circuits may be coupled together to drive the electrical generator 908. As can be appreciated, hydraulic system 900 may include identical hydraulic circuits (i.e., all hydraulic circuit 600), or may include any combination of hydraulic circuits 600, 700, and/or 800. As illustrated in FIG. 11, hydraulic system 900 includes one of each of hydraulic circuits 600, 700, and 800. Each of hydraulic circuits 600, 700, and 800 are disposed in a parallel configuration, and include a high pressure line 902a on a high pressure side 902 and a low pressure line 904a on a low pressure side 904. A hydraulic motor 906 is disposed at the end of hydraulic system 900 and is in hydraulic communication with each of the high pressure line 902a and low pressure line 904a. An output shaft (not shown) of the hydraulic motor 906 is in mechanical communication with an electrical generator 908 (or electrical generator 502 of FIG. 12). A high pressure accumulator 902b is hydraulically coupled to the high pressure line 902a between the final hydraulic circuit and the hydraulic motor 906, and a low pressure accumulator 904b is hydraulically coupled to the low pressure line 904a between the hydraulic motor 906 and the final hydraulic circuit. A filter 904c including a differential pressure switch is hydraulically coupled to the low pressure line 904a between the low pressure accumulator 904b and the final hydraulic circuit, thereby removing any contaminants from the hydraulic system 900 before re-entering each of the hydraulic circuits 600, 700, and 800. Each of the hydraulic circuits 600, 700, 800 contributes to pressurizing the hydraulic fluid contained within high pressure line 902a. As can be appreciated, each of the hydraulic circuits 600, 700, 800 may contribute to the pressurization of the hydraulic fluid in an individual capacity. In this manner, the pods 120 are not required to simultaneously contribute to the pressurization and may move independent of each other. Indeed, the combination of each of the one way valves, 606a, 704a, 804a, and 806a of respective hydraulic circuits 600, 700, and 800 ensure that high pressure hydraulic fluid may not flow back into any of the hydraulic rotary actuator 602, hydraulic pump 702, or hydraulic actuator 402. A further benefit of individual contributions to pressurizing the hydraulic fluid is that there are fewer pressure drops as the pressurized hydraulic fluid drives the hydraulic motor 906 (i.e., a more continuous flow/pressure is provided), thereby providing a more continuous generation of electrical energy. An alternative hydraulic system 900 is illustrated in FIG. 16A.

Figure 17:
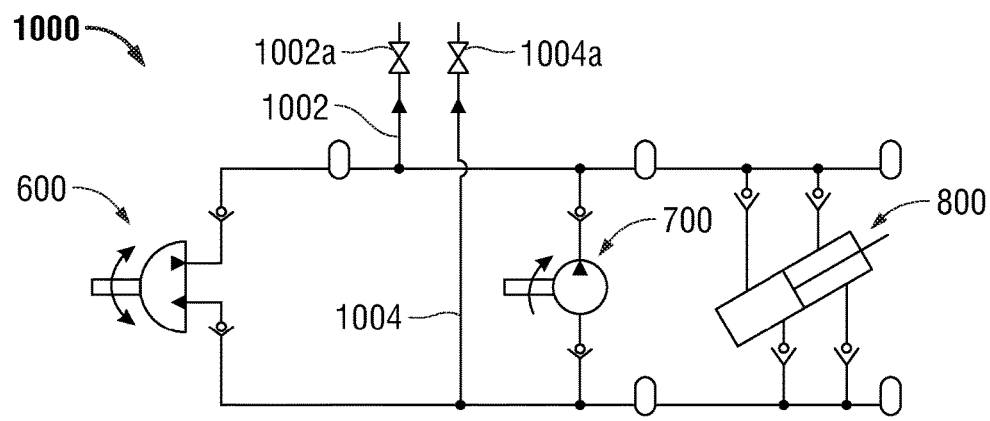
FIG. 17 is a schematic view of another hydraulic system provided in accordance with the present disclosure, including the hydraulic circuits of FIGS. 13, 14, and 15.

FIG. 17 illustrates another hydraulic system 1000 having a plurality of hydraulic circuits hydraulically coupled thereto. Hydraulic system 1000 is similar to hydraulic system 900 discussed above, and therefore, only the differences therebetween will be discussed in the interest of brevity. Hydraulic system 1000 includes a high pressure tee 1002 having a first gate valve 1002a hydraulically coupled thereto, ultimately terminating at a high pressure side of hydraulic motor 906 (FIG. 16). First gate valve 1002a is disposed upstream of hydraulic motor 906 and may be any suitable gate valve capable of cutting off the flow of hydraulic fluid to hydraulic motor 906. Hydraulic system 1000 further includes a low pressure tee 1004 having a second gate valve 1004a hydraulically coupled thereto, ultimately terminating at a low pressure side of hydraulic motor 906. Second gate valve 1004a is disposed downstream of hydraulic motor 906 and may be any suitable gate valve capable of cutting off the flow of hydraulic fluid from hydraulic motor 906. It is contemplated that first and second gate valves 1002a, 1004a may be a manual gate valve, automatic gate valve, or the like. In combination, when first and second gate valves 1002a, 1004a are shut, hydraulic circuits 600, 700, and 800 are isolated from hydraulic motor 906. In this manner, service may be performed on either hydraulic motor 906 or any of the hydraulic circuits 600, 700, or 800.

Figure 18:
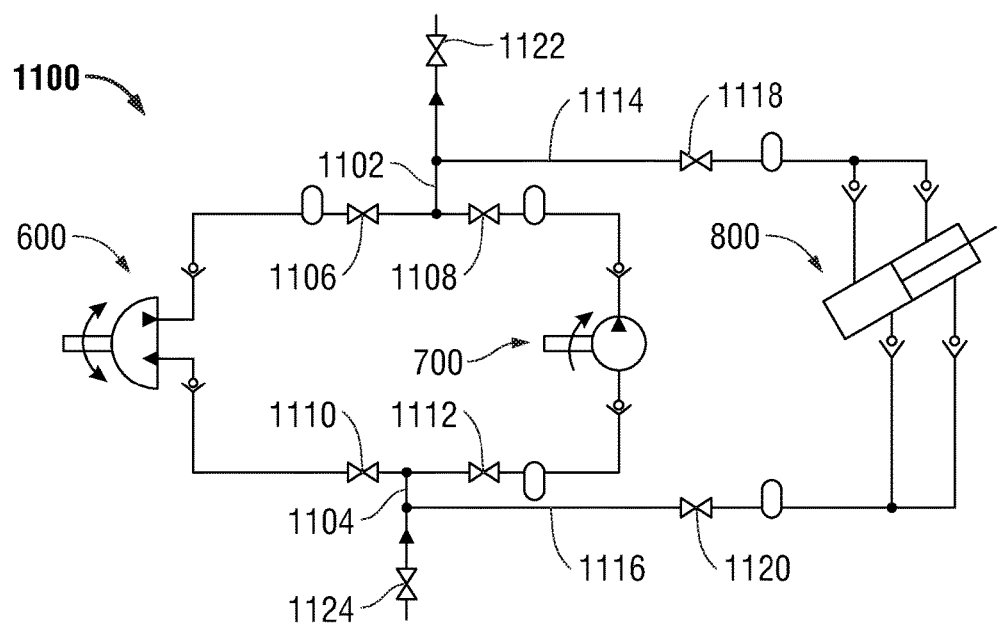
FIG. 18 is a schematic view of yet another hydraulic system provided in accordance with the present disclosure, including the hydraulic circuits of FIGS. 13, 14, and 15.

Referring now to FIG. 18, a hydraulic system 1100 capable of individually isolating each of the hydraulic circuits 600, 700, and 800 is illustrated. Hydraulic system 1100 is similar to hydraulic system 1000, discussed above, and therefore only the differences therebetween will be discussed in the interest of brevity. Hydraulic system 1100 includes three hydraulic circuits hydraulically coupled to form hydraulic system 1100. The first two hydraulic circuits, 600, 700 include a high pressure tee 1102 and a low pressure tee 1104 interposed therebetween. Each of the hydraulic circuits 600, 700, include a respective high pressure gate valve, 1106, 1108, and a respective low pressure gate valve 1110, 1112 disposed adjacent to each of the high pressure tee 1102 and low pressure tee 1104. Additionally, third hydraulic circuit 800 includes a high pressure line 1114 hydraulically coupled to high pressure tee 1102 and a low pressure line 1116 hydraulically coupled to low pressure tee 1104. Third hydraulic circuit 800 includes a high pressure valve 1118 disposed adjacent to high pressure tee 1102 and a low pressure gate valve 1120 dispose adjacent to low pressure tee 1104. Similarly to hydraulic system 1000, each of the high pressure tee and low pressure tee includes a respective gate valve 1122, 1124. In this manner, hydraulic system 1100 may be selectively isolated from a hydraulic motor (not shown), or, as desired, each hydraulic circuit 600, 700, and/or 800 may be individually isolated from the rest of hydraulic system 1100.

As can be appreciated, each of hydraulic circuits 600, 700, 800, and each of hydraulic systems 900, 1000, 1100 may include a redundant circuit hydraulically coupled to a respective hydraulic motor. In this manner, if an issue arises with one hydraulic motor, that particular circuit may be isolated while maintaining the ability to generate electrical energy while a technician performs service or repairs to the affected circuit.

Figure 19A:
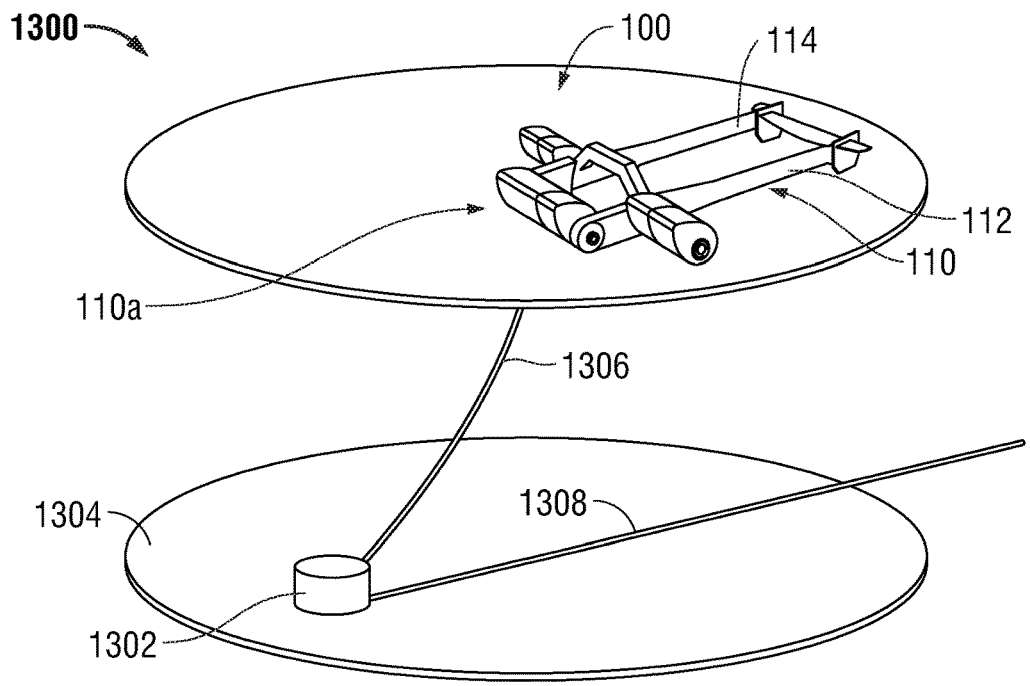
FIG. 19A is a perspective view of the system of FIG. 1, shown in a floating position.
Figure 19B:
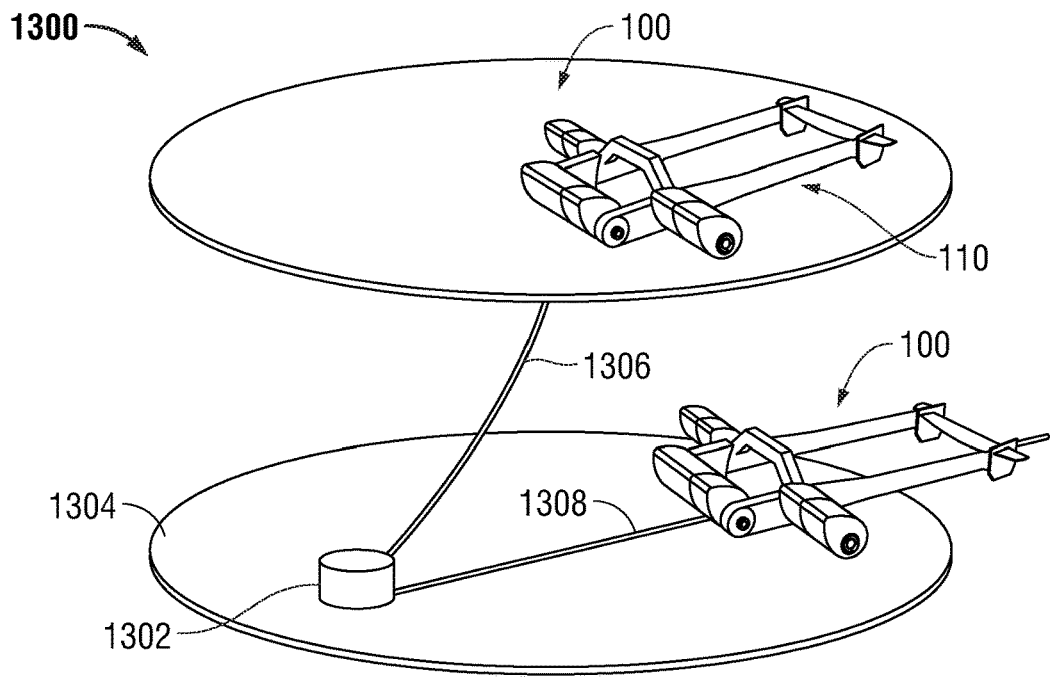
FIG. 19B is a perspective view of the system of FIG. 19A, shown in a submerged position.

As illustrated in FIGS. 19A and 19B, system 100 includes a ballasting system 1300 capable of submerging system 100 in the event a storm. Ballasting system 1300 includes a mooring 1302 resting on a seabed 1304 and a mooring line 1306 fixedly secured to the mooring 1302 at a first end and fixedly secured to the windward end 110a of platform structure 110 using any suitable means. Mooring 1302 may be any suitable mooring, such as a swing mooring, fore and aft mooring, pile mooring, or the like. It is contemplated that the mooring line may be any suitable line such as a chain, rope, steel cable, or the like and may include a suitable electrical line (not shown) attached thereto; however, it is contemplated that mooring line 1306 may be capable of transmitting electrical energy generated by system 100, and then transmitted back to shore or a floating electrical substation (not shown) via an undersea cable 1308. Ballasting system 1300 may include a pump (not shown) capable of drawing water from the sea within chambers (not shown) defined within each of elongate members 112, 114 of platform structure 110; although other configurations are also contemplated, such as air pumps, stand-alone water/air chambers, or the like. In the event of a storm or other natural event that would imperil system 100, the ballasting system draws water into the chambers (or expels air) in order to submerge system 100 (FIG. 19B). It is contemplated that ballasting system 1300 may submerge system 100 a certain depth beneath the sea or may submerge system 100 until platform structure 110 rests on the sea bed 1304. The depth at which system 100 is submerged is dependent upon the depth of the sea and the intensity of the storm.

Figure 20:
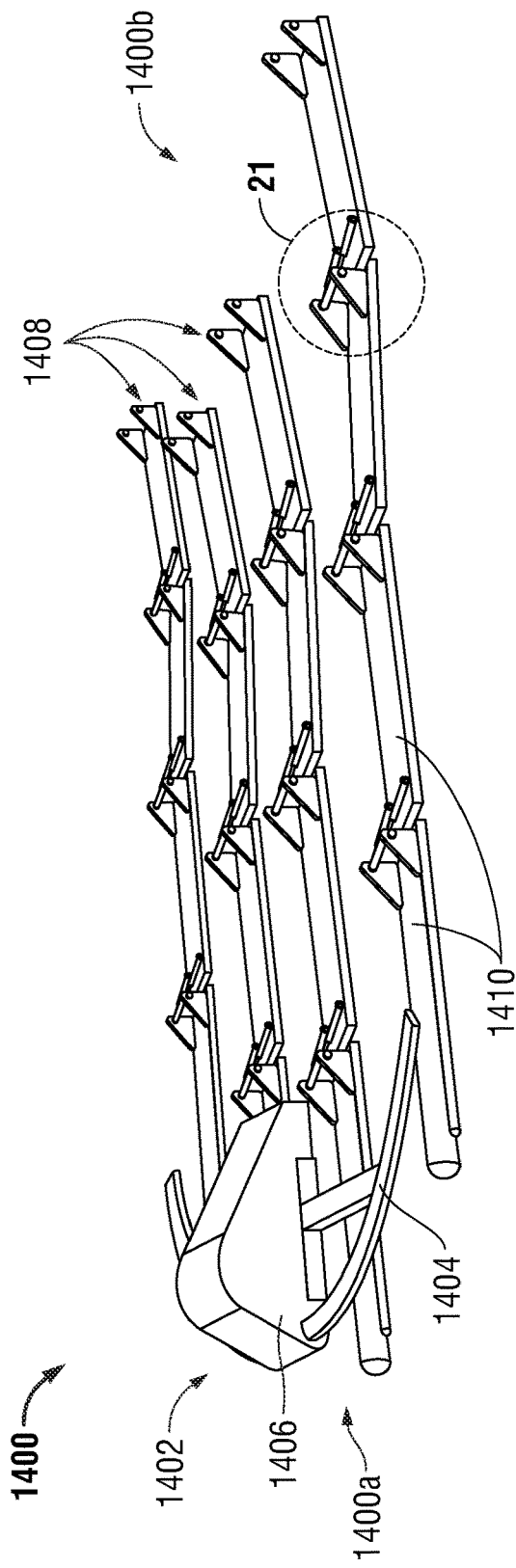
FIG. 20 is a perspective view of yet another system provided in accordance with the present disclosure capable of extracting energy from waves.
Figure 21:
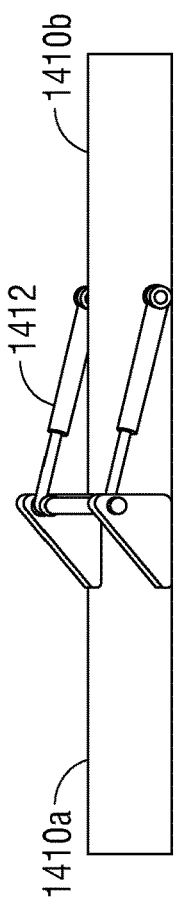
FIG. 21 is an enlarged view of the indicated area of detail of FIG. 20.

Referring now to FIGS. 20 and 21, an illustration of another system capable of extracting energy from waves is provided and generally referred to by reference numeral 1400. System 1400 includes a head or platform structure 1402 disposed at a windward or leading end 1400a. Head 1402 includes an arcuate beam 1404 having ends that curve and extend towards a leeward or trailing end 1400b. Head 1402 includes a compartment 1406 disposed on arcuate beam 1404 at a location that bisects arcuate beam 1404, although other configurations are also contemplated. A plurality of tails 1408, each consisting of a plurality of interconnected elongate members 1410, is rotatably secured to an underside of arcuate beam 1404 at equally spaced locations along arcuate beam 1404. Each of the plurality of interconnected elongate members 1410 is rotatable secured to the next, such that each elongate member 1410 may conform to the shape of a wave that is passing thereunder. In order to extract energy from the waves, each elongate member of the plurality of elongate members includes at least one hydraulic actuator 1412 (FIG. 21) that is rotatably supported on a leading elongate member 1410a on a first end, and is rotatably supported on a trailing elongate member 1410b on a second end. In this manner, as each elongate member articulates (i.e., follows the shape of the wave), the hydraulic actuator 1412 is compressed or extended, thereby pumping hydraulic fluid throughout a hydraulic system (not shown) disposed on or within head 1402.

As can be appreciated, the hydraulic circuit used for each hydraulic actuator may be similar to hydraulic circuit 800, discussed above, and the hydraulic system (not shown) hydraulically coupling each hydraulic circuit may be similar to any of hydraulic systems 900, 1000, or 1100 discussed above. It is contemplated that compartment 1406 may be watertight and may include an electrical generator (not shown) and other hydraulic components (e.g., accumulators, gate valves, etc.), thereby shielding such components from the sea and other elements.

It is contemplated that system 1400 may include any or all of the components or systems described above, such as ballasting system 1300, beacon 140, and/or wave measuring device 150.

It is further contemplated that the electrical power generated using any of the above embodiments may be used to generate and store hydrogen. In this manner, the electrical energy extracted from the waves may power an electrolyzer (not shown) fixedly secured to platform structure 110. The electrolyzer may be any suitable electrolyzer capable of decomposing water into oxygen and hydrogen gas and is in electrical communication with the electrical generator 502 (FIG. 12). The generated hydrogen may then be separated from the oxygen using any suitable means known in the art and may be stored within suitable tanks (not shown) capable of storing and selectively releasing the hydrogen gas. It is contemplated that the tanks may be disposed within elongate members 112, 114 of platform structure 110, may be disposed at any suitable location on platform structure 110, or may be located remote from platform structure 110. As can be appreciated, any of the above described systems may include the ability to both generate hydrogen and transmit electricity, either simultaneously or selectively by means of a switch (not shown) or any other suitable means. It is further contemplated that the oxygen gas separated from the water by the electrolyzer may be utilized in ballasting system 1300.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments.

What is claimed is:

1. A wave energy conversion system, comprising:
 a pod rotatably supported by a platform structure;
 a multi-radius energy transmission mechanism in mechanical communication with the pod, the multi-radius energy transmission mechanism including a plurality of gears, wherein as the pod rotates in a first direction, a radius of a first gear of the plurality of gears increases and a radius of a second gear of the plurality of gears decreases at a mesh point therebetween to provide increasing resistance to rotation of the pod as the pod is rotated in the first direction; and an energy conversion device coupled to the multi-radius energy transmission mechanism.

2. The wave energy conversion system according to claim 1, wherein the pod is buoyant and is configured to be rotated in the first direction as a wave contacts a planar side surface disposed on a leading side of the pod.

3. The wave energy conversion system according to claim 2, wherein the multi-radius energy transmission mechanism includes a drive gear rotatably supported on a drive-shaft extending through the center of rotation of the pod.

4. The wave energy conversion system according to claim 3, wherein the drive gear is mechanically coupled to the pod.

5. The wave energy conversion system according to claim 4, wherein the multi-radius energy transmission mechanism includes a driven gear rotatably supported on a post fixedly secured to the platform structure.

6. The wave energy conversion system according to claim 1, wherein rotation of the pod initiates rotation of the drive gear about the driveshaft, thereby initiating a rotation of the driven gear about the post.

7. The wave energy conversion system according to claim 1, wherein the multi-radius energy transmission mechanism includes a spur gear rotatably supported on the post.

8. The wave energy conversion system according to claim 7, wherein the spur gear is in mechanical communication with the driven gear and the energy conversion device.

9. The wave energy conversion system according to claim 1, wherein the energy conversion device is an electric generator.

10. The wave energy conversion system according to claim 1, wherein the energy conversion device is a hydraulic pump.

11. The wave energy conversion system according to claim 10, wherein the hydraulic pump is coupled to a hydraulic motor.

12. The wave energy conversion system according to claim 11, wherein the hydraulic motor is coupled to an electric generator.

13. The wave energy conversion system according to claim 1, wherein the platform structure is configured to float.

14. The wave energy conversion system according to claim 13, wherein the platform structure is configured to be submerged.

15. The wave energy conversion system according to claim 1, wherein in a first configuration the platform structure is configured to float and in a second configuration the platform structure is configured to be submerged.

16. A wave energy conversion apparatus, comprising;
    a multi-radius energy transmission mechanism adapted to be coupled in mechanical communication with a pod rotatably supported by a platform structure, the multi-radius energy transmission mechanism including a plurality of gears, wherein a radius of a first gear of the plurality of gears increases and a radius of a second gear of the plurality of gears decreases at a mesh point therebetween to provide increasing resistance to rotation as the plurality of gears is rotated; and
    an energy conversion device coupled to the multi-radius energy transmission mechanism.

17. A multi-radius transmission mechanism for use with a wave energy conversion system, comprising:
    a plurality of gears, wherein a radius of a first gear of the plurality of gears increases and a radius of a second gear of the plurality of gears decreases at a mesh point therebetween to provide increasing resistance to rotation as the plurality of gears is rotated,
    wherein at least one of the plurality of gears is adapted to be coupled in mechanical communication with a pod rotatably supported by a platform structure.

* * * * *